United States Patent [19]

Iikubo et al.

[11] Patent Number: 4,927,601
[45] Date of Patent: May 22, 1990

[54] HEAT RESISTING BEARING STEEL

[75] Inventors: Tomohito Iikubo, Nagoya; Yutaka Kurebayashi, Tokai, both of Japan

[73] Assignee: Daido Tokushuko Kabushiki Kaisha, Nagoya, Japan

[21] Appl. No.: 240,658

[22] Filed: Sep. 6, 1988

[51] Int. Cl.$^5$ .................. C22C 38/22; C22C 38/24
[52] U.S. Cl. ...................................... 420/111; 148/906
[58] Field of Search ................ 148/906, 334; 420/111

[56] References Cited

U.S. PATENT DOCUMENTS 4,642,219  2/1987  Takata et al. .................. 148/333

Primary Examiner—Deborah Yee
Attorney, Agent, or Firm—Armstrong, Nikaido, Marmelstein, Kubovcik & Murray

[57] ABSTRACT

A heat resisting bearing steel having improved rolling fatigue life is disclosed. This steel consists essentially of 0.6–0.9% C, up to 0.5% Si, up to 0.5% Mn, 3.0–5.5% Cr, 3.0–5.0% Mo and 0.5–1.5% V, and the balance being Fe and inevitable impurities, and is characterized in that the content of large $Al_2O_3$ inclusions with 10 micron or larger length is restricted to 1.5 ppm or less.

The rolling fatigue life of this steel is long and fluctuation of the life is small, and therefore, the steel is highly reliable. It is suitable for the material of bearing to be used at a high peripheral speed and a high temperature such as the main rotational bearings of a heat engine such as a gas turbine.

2 Claims, 2 Drawing Sheets

HEAT RESISTING BEARING STEEL

BACKGROUND OF THE INVENTION

1. Field of the Invention

This invention relates to a bearing steel, more particularly, to a steel suitable for the material of bearings to be used at a high temperature.

2. State of the Art

Bearings supporting a main rotating shaft of a gas turbine are used under very severe conditions of a high temperature in addition to a very high peripheral speed.

Needless to say, a heat engine exhibits a higher efficiency when it is operated at a higher temperature, and therefore, it is desired to raise the operation temperature of a turbine up to the allowable limit. The bearings are also requested to have a heat resistance durable at a temperature of 300° C. or more. Further, as the results of higher speed and larger size, the peripheral velocity of the bearings becomes inevitably higher. Bearings are required to have high reliability to secure safety operation of rotational machinery for a long period of time.

The representative heat resistant bearing steel presently being used is AISI-M50 steel, which consists of 0.77–0.85% C, up to 0.35% Si, up to 0.35% Mn, 3.75–4.25% Cr, 4.00–4.50% Mo and 0.90–1.10% V, and the balance being Fe and inevitable impurities.

It is demanded to give higher reliability under severe working conditions to this material or other steels of similar alloy compositions.

SUMMARY OF THE INVENTION

It is the object of this invention to satisfy the above demand and provide a heat resisting bearing steel which secures high reliability.

The heat resisting bearing steel of the present invention to achieve this object consists essentially of 0.6–0.9% C, up to 0.5% Si, up to 0.5% Mn, 3.0–5.5% Cr, 3.0–5.0% Mo and 0.5–1.5% V, and the balance being Fe and inevitable impurities; and the content of large $Al_2O_3$ inclusions therein with 10 micron or larger length being restricted to 1.5 ppm or less.

The typical composition of this alloy is, in the above ranges, in accordance with the above noted composition of AISI-M50 steel, which consists of 0.77–0.85% C, up to 0.35% Si, up to 0.35% Mn, 3.75–4.25% Cr, 4.00–4.50% Mo and 0.90–1.10% V, and the balance being Fe and inevitable impurities.

BRIEF EXPLANATION OF THE DRAWINGS

All the figures illustrate the data of working examples of the present invention; wherein.

DETAILED EXPLANATION OF PREFERRED EMBODIMENTS

Figure 1:
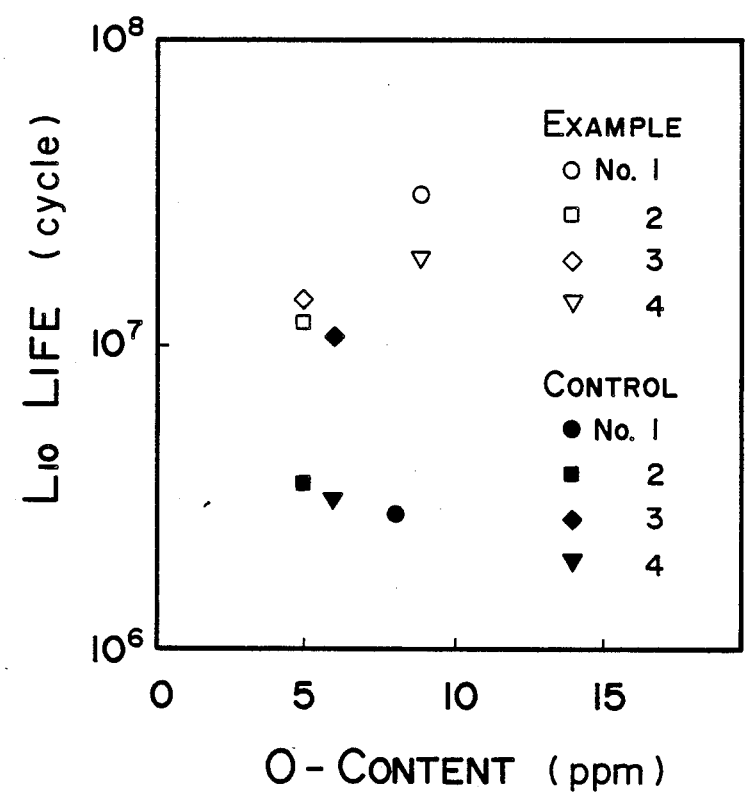
FIG. 1 is a graph made by plotting the relation between the O contents in the bearing steel and the rolling fatigue life $L_{10}$.

To reduce the content of large $Al_2O_3$ inclusion with 10 micron or larger length to 1.5 ppm or less, it is necessary first to reduce the quantities of Al and O which produce $Al_2O_3$, and it is recommended to adopt a suitable steel refining method such as ladle refining (LF), vacuum arc furnace remelting (VAR), or VAR preceded by vacuum induction furnace melting (VI), or vacuum degassing (RH).

In addition to the above, it is desirable to allow sufficient standing time of the refining process to allow floating separations of the inclusions. Of course, the selection of refractory to be used for refining is important. A smaller ingot size is advantageous to avoid aggregation of inclusion of huge particles.

The alloy composition of the present heat resisting bearing steel is limited to the percentages as stated above for the following reasons:

C : 0.6–0.9%, preferably 0.77–0.85%

Content of 0.6% or more of C is necessary to obtain a necessary hardness for a bearing. However, increased amounts of the C-content heightens the retained austenite resulting in lowering of hardness, and therefore, C-content should not exceed 0.9%. The suitable range of C-content is relatively narrow as stated above.

Si: up to 0.5%, preferably up to 0.35%

Silicon is necessary as a deoxidizer, however, too much Si deteriorates the clearness, and reduces toughness, and is restricted to the above range.

Cr: 3.0–5.5%, preferably 3.75–4.25%

Mo: 3.0–5.5%, preferably 4.00–4.50%

V: 0.5–1.5%, preferably 0.90–1.10%

These elements form carbides to impart wear resistance to the composition, therefore, they should be added in the amounts of at least their respective lower limits. Cr and Mo function to improve the hardenability. Additional benefits are not achieved using amounts larger than the upper values set forth above. Therefore, it is advisable to limit the amounts to the upper limits in consideration of economy.

Large $Al_2O_3$ inclusions with 10 micron or larger length: 1.5 ppm or less.

The inventor pursued the factors which cause failures such as flaking in heat resisting bearings from the material side, and first investigated the relation between O-content and rolling fatigue life considering the bad effects of all the oxide inclusions. However, no interrelations therebetween where found is seen in the examples described later. Moreover, it was clarified that there is no interrelation between the total quantity of $Al_2O_3$ inclusions, which consist the major part of the oxide inclusions, and the rolling fatigue life. Finally, investigation was made paying attention to the size of the $Al_2O_3$ inclusions, and found that the quantity of large size $Al_2O_3$ inclusions with the length of 10 micron or larger is a key factor, and it was verified that 1.5 ppm is the critical value for the allowable quantity.

The heat resisting bearing steel of this invention remarkably extends the rolling fatigue life of such steel in comparison to conventional materials by restricting large size $Al_2O_3$ inclusions. The steels of the present invention have a higher reliability because of the reduced fluctuation of the life.

Therefore, the material is most suitable for manufacturing bearings to be used at a high peripheral speed and at a high temperature such as main bearings of heat engines including gas turbines.

EXAMPLES

Steel of the composition as shown in the Table were all manufactured by the process of arc furnace melting, ladle refining, and vacuum degassing. In the production, the steels of the examples were melted with attention to obtaining floating separation of inclusions in ladle refining, and the steels of the controls were melted without particular attention.

$Al_2O_3$ inclusions of each test sample were quantified in accordance with its size to the four groups: 10 micron or more, 10 to 5 micron, 5 to 2 micron, and 2 to 0.2 micron. The inclusions were analysed in accordance with the hot sulfuric acid method specified in JIS. Total quantity of $Al_2O_3$ and the quantity of the large size inclusions of 10 micron or more are indicated in the Table. The thrust rolling fatigue life of the steels were tested under the following conditions:

Bearing pressure: 500 kgf/mm$^2$
Rotational speed: 3600 rpm
Lubrication Oil: #180 Turbine Oil $L_{10}$ (10% failure probability) and $L_{50}$ were measured and entered in the Table. These values were plotted on a Weibull probability chart, and the coefficients "e" obtained from the chart were also entered in the Table.

FIG. 1 was obtained by plotting the relation between O-contents and $L_{10}$ in the Table. This graph indicates no interrelation between O-content and $L_{10}$.

Figure 2:
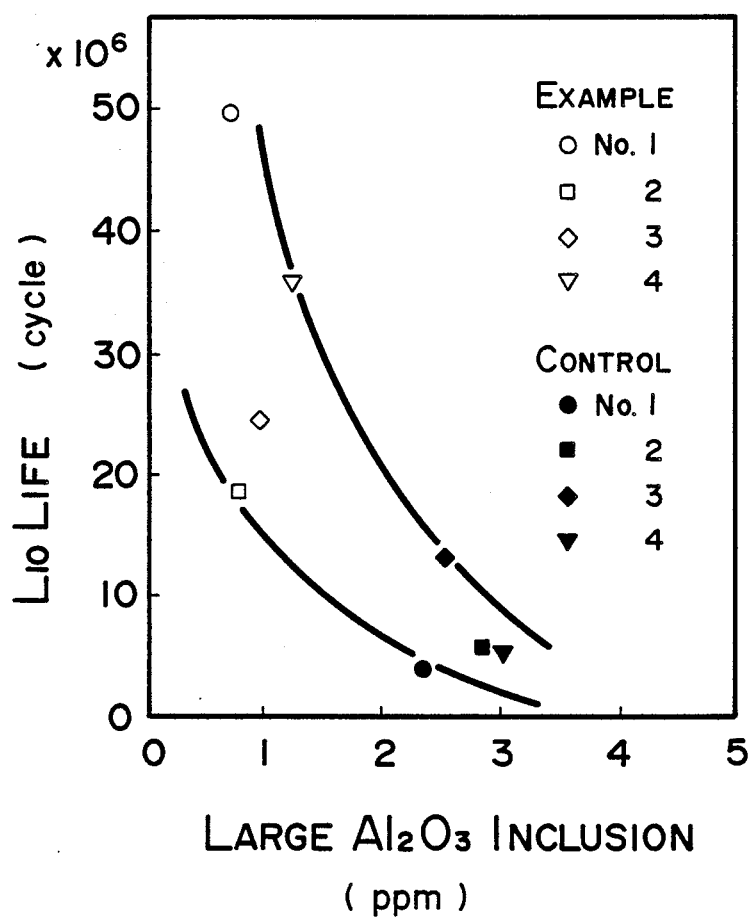
FIG. 2 is a graph made by plotting the relation between the contents of large size $Al_2O_3$ in the bearing steel and the rolling fatigue life $L_{10}$.

On the other hand, FIG. 2 was obtained by plotting the relation between quantities of $Al_2O_3$ of the size of 10 micron or more and $L_{10}$, showing distinct interrelations. It was clarified that the bearing steel of this invention which satisfies the condition of 1.5 ppm or less contents of $Al_2O_3$ has a distinctively superior rolling fatigue life in comparison with the control steels.

The values of Weibull coefficient "e" in the Table are 0.97 to 1.17 for the control steels. On the other hand, a high level of 2.20 to 3.12 was attained by the example steels.

TABLE

| | Composition of Alloys (weight %, balance Fe) | | | | | | $Al_2O_3$ (ppm) Inclusions | | Rolling Fatigue Life | | |
|---|---|---|---|---|---|---|---|---|---|---|---|
| | | | | | | | | | × 10$^6$ cycle | | Weibull |
| No. | C | Si | Mn | Cr | Mo | V | O | Total | ≧10 um | $L_{10}$ | $L_{50}$ | Coef. "e" |
| Example steels | | | | | | | | | | | | |
| 1 | 0.84 | 0.20 | 0.22 | 4.01 | 4.15 | 0.95 | 0.0009 | 10.5 | 0.6 | 49.7 | 90.9 | 3.12 |
| 2 | 0.83 | 0.22 | 0.23 | 4.07 | 4.20 | 0.97 | 0.0006 | 11.8 | 0.9 | 19.3 | 49.0 | 2.02 |
| 3 | 0.82 | 0.22 | 0.24 | 4.04 | 4.17 | 0.95 | 0.0006 | 12.4 | 1.0 | 24.2 | 57.6 | 2.19 |
| 4 | 0.84 | 0.21 | 0.29 | 4.06 | 4.12 | 0.96 | 0.0009 | 12.2 | 1.2 | 36.8 | 62.3 | 2.36 |
| Control steels | | | | | | | | | | | | |
| 1 | 0.84 | 0.22 | 0.28 | 4.17 | 4.35 | 1.01 | 0.0008 | 13.4 | 2.3 | 4.4 | 28.9 | 1.00 |
| 2 | 0.84 | 0.12 | 0.27 | 4.16 | 4.50 | 1.04 | 0.0005 | 10.8 | 2.9 | 4.7 | 32.7 | 0.97 |
| 3 | 0.82 | 0.20 | 0.26 | 4.25 | 4.19 | 0.97 | 0.0006 | 9.8 | 2.4 | 12.7 | 65.4 | 1.12 |
| 4 | 0.82 | 0.17 | 0.27 | 4.17 | 4.18 | 0.96 | 0.0006 | 11.1 | 3.0 | 4.6 | 22.8 | 1.17 |

We claim:

1. A heat resisting bearing steel consisting essentially of 0.6–0.9 % C, up to 0.5 % Si, up to 0.5% Mn, 3.0–5.5 % Cr, 3.0 to 5.0% Mo and 0.5–1.5% V, and the balance being Fe and inevitable impurities; and the content of large $Al_2O_3$ inclusions having a length of 10 microns or larger being restricted to 1.5 ppm or less.

2. A heat resisting bearing steel of claim 1, wherein the steel consisting essentially of 0.77–0.85% C, up to 0.35% Si, up to 0.35% Mn, 3.75–4.25% Cr, 4.00–4.50% Mo and 0.90–1.10% V, and the balance being Fe and inevitable impurities.

* * * * *